(12) United States Patent
Aoyagi et al.

(10) Patent No.: US 7,672,296 B2
(45) Date of Patent: Mar. 2, 2010

(54) REAL-TIME COMMUNICATIONS SYSTEM OF HIGH COMMUNICATIONS QUALITY AND MEDIA TERMINAL APPARATUS

(75) Inventors: Hiromi Aoyagi, Kanagawa (JP); Yumiko Araki, Chiba (JP); Shinji Usuba, Tokyo (JP); Hiroshi Kuboki, Kanagawa (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1032 days.

(21) Appl. No.: 10/994,335

(22) Filed: Nov. 23, 2004

(65) Prior Publication Data

US 2005/0117569 A1 Jun. 2, 2005

(30) Foreign Application Priority Data

Nov. 28, 2003 (JP) ............................. 2003-400080

(51) Int. Cl.
H04L 12/66 (2006.01)
H04J 3/22 (2006.01)
H04N 7/14 (2006.01)

(52) U.S. Cl. ...................... 370/352; 370/389; 370/465; 348/14.01

(58) Field of Classification Search ................. 370/352, 370/389, 395.52, 395.53, 465–467, 469, 370/480, 493–495; 348/14.01; 84/470, 470 R; 434/307 A See application file for complete search history.

(56) References Cited

U.S. PATENT DOCUMENTS

| | | | |
|---|---|---|---|
| 5,533,112 A * | 7/1996 | Danneels | 379/202.01 |
| 6,660,922 B1 * | 12/2003 | Roeder | 84/477 R |
| 6,785,267 B1 * | 8/2004 | Knappe | 370/353 |
| 2002/0091847 A1 * | 7/2002 | Curtin | 709/231 |
| 2003/0133440 A1 * | 7/2003 | Reynolds et al. | 370/352 |
| 2004/0114032 A1 * | 6/2004 | Kakii et al. | 348/14.08 |
| 2004/0207719 A1 * | 10/2004 | Tervo et al. | 348/14.02 |

FOREIGN PATENT DOCUMENTS

| | | |
|---|---|---|
| JP | 01-293382 | 11/1989 |
| JP | 10-143456 | 5/1998 |
| JP | 2002-323849 | 11/2002 |
| JP | 2003-006348 | 1/2003 |
| JP | 2003107986 | 4/2003 |

* cited by examiner

*Primary Examiner*—Hong Cho
*Assistant Examiner*—Saba Tsegaye
(74) *Attorney, Agent, or Firm*—Rabin and Berdo, P.C.

(57) ABSTRACT

A VoIP system has plural CPE units connected to an IP network as parties to be connected with each other. Each CPE unit is composed of a VoIP-IF circuit and an audio codec circuit. The VoIP-IF circuit executes at least one of the coding process to the first audio frequency signal and the restoration process to the media information to transmit the media information generated by the process to the party connected and restore the first audio frequency signal from the media information supplied from the party connected to output it. The audio codec circuit performs at least one of the sending of the received music data to the party and the conversion of the music data supplied from the party into the second audio frequency signal.

20 Claims, 10 Drawing Sheets

REAL-TIME COMMUNICATIONS SYSTEM OF HIGH COMMUNICATIONS QUALITY AND MEDIA TERMINAL APPARATUS

BACKGROUND OF THE INVENTION

1. Field of the Invention

The present invention relates to a real-time communications system of high communications quality and a media terminal apparatus. More particularly, the present invention relates to a real-time communications system preferably applicable to voice communications based upon VoIP (Voice over Internet Protocol) technology. The present invention also relates to a media terminal apparatus treats data according to the MIDI (Musical Instrument Digital Interface) standard.

2. Description of the Background Art

A musical instrument according to the MIDI (Musical Instrument Digital Interface) standard and the like can output MIDI data. MIDI data are not of a waveform of sound itself, but are obtained by conversion of several parameters, such as pitch, length and tone, of sound into numerical data. The performance contents of an electronic musical instrument can therefore be described with considerably smaller size than that of data directly coded from waveform itself.

Utilization of the MIDI standard makes it possible to implement a lesson method of allowing a student to store MIDI data obtained from his or her performance of an electronic musical instrument in a storage medium and send the storage medium via mail or postal service to his or her instructor staying in a remote site to notify the instructor of the performance contents, based upon which the instructor can then coach the student on his or her performance.

In addition, it is possible to use an analog telephone service provided in an ordinary public switched telephone network (PSTN) to transmit sound or voice. It is therefore not necessarily impossible to use the analog telephone service to carry out lessons of karaoke, vocal music and/or instrumental performance.

Generally, the bandwidth of voice signals transmitted by an analog telephone service is limited to a very narrow bandwidth of 300-3,400 Hz. An ordinary voice transmission is possible without any trouble in the bandwidth. Because of the limited bandwidth, however, the communications quality is too low for vocal music, karaoke and musical instrumental lesson. More specifically, for voice and sound signals of vocal music, karaoke and musical instruments, the frequency components lower than 300 Hz and higher than 3,400 Hz are very important. Nevertheless, by the analog telephone service, those important components are cut out so as not to be transmitted. Many problems are thus involved in the communications in which the frequency signals outside the voice band are treated.

Further, when sending a storage medium having MIDI data stored via postal service, there is not a problem of required bandwidth, but there is non-real-time property. Therefore, it is difficult to promote communication between a trainee and an instructor and carry out music lessons effectively.

SUMMARY OF THE INVENTION

It is an object of the present invention to diminish the defects described above, and provide a novel real-time communications system maintaining high communications quality, and a media terminal apparatus, by which real-time mutual communication is established between users.

In accordance with the present invention, a real-time communications system on a network based upon a communications protocol is provided, in which audio frequency media information associated with a first audio frequency signal is inserted into data of a protocol data associated with the communications protocol, and first and second media terminal units used by users communicate with each other on a real-time basis by at least one of transmission and reception. The system comprises: an information conversion circuit for executing in real-time communications at least one of generation of the audio frequency media information by coding on a basis of the first audio frequency signal received from the first terminal unit and restoration of the first audio frequency signal on a basis of the audio frequency media information supplied from the second terminal unit; and an interface circuit for executing at least one of reception of first music data having a data format and supplied from the second media terminal unit to convert the first music data into a second audio frequency signal and reception of second music data from the first media terminal unit to transmit the second music data.

In accordance with the present invention, the first and second media terminal units are connected to the network to communicate with each other as parties to be connected. By at least one of the coding process of the first audio frequency signal and the restoration process of the media information, the information conversion circuit of each media terminal unit sends out the media information generated by the process to the party connected and outputs the first audio frequency signal restored from the media information supplied from the party connected, and the interface circuit of the terminal units executes at least one of the sending the received music data to the party connected and the conversion of the music data from the party connected into the second audio frequency signal. By outputting the sound of transmission characteristic covering the first and second audio frequency signals from the respective media terminal units, mutual communication can be promoted extensively the between users.

Further, in accordance with the invention, a media terminal apparatus is provided which is interconnected to a network based upon a communications protocol for inserting audio frequency media information associated with a first audio frequency signal into data of a protocol data associated with the communication protocol, and communicating with a party connected thereto on a real-time basis. The apparatus comprises: an information conversion circuit for executing in real-time communications at least one of generation of the audio frequency media information by coding on a basis of the first audio frequency signal received from a near end thereto and restoration of the first audio frequency signal on a basis of the audio frequency media information supplied from the party connected; and an interface circuit for executing at least one of reception of first music data having a data format and supplied from the party connected to convert the first music data into a second audio frequency signal and reception of second music data from the near end to transmit the second music data.

In accordance with the present invention, by at least one of the coding process of the first audio frequency signal and the restoration process of the media information, the information conversion circuit transmits the media information generated by the process and outputs the first audio frequency signal restored from the supplied media information. By at least one of the outputting the received music data and the conversion of the music data into the second audio frequency signal, the interface circuit outputs the sound of transmission characteristic covering the first and second audio frequency signals from the respective media terminal units. The communications quality can therefore be enhanced, as well as real-time mutual communication can be established by using plural kinds of information.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

In the following, embodiments of the real-time communications system according to the invention will be described in detail with reference to the accompanying drawings. The illustrative embodiments are directed to applications of the real-time communications system to VoIP systems 10 according to the invention. Elements and parts not directly relating to understanding the invention are omitted from the figures and description.

Figure 1:
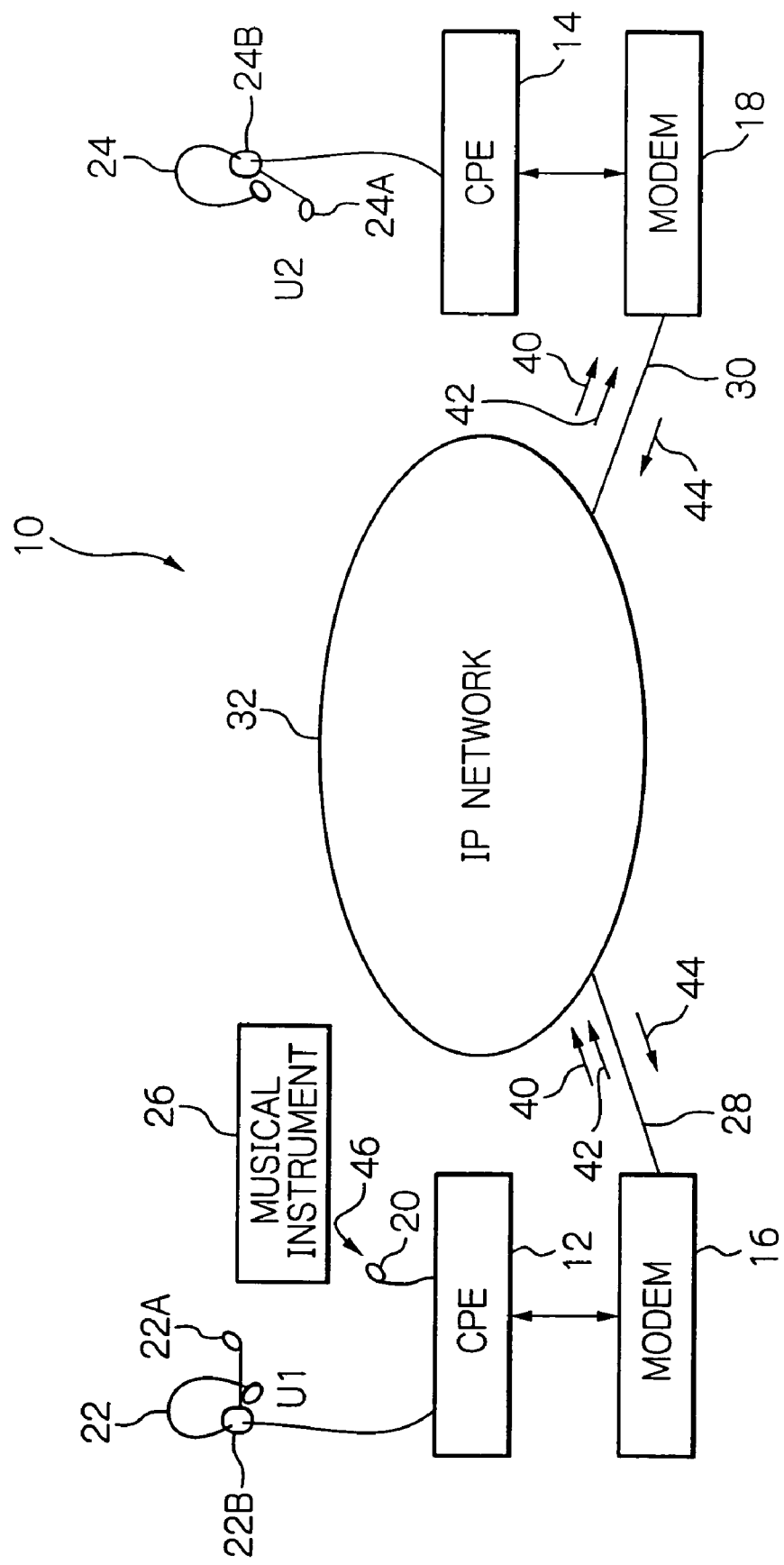
FIG. 1 shows in a block diagram a schematic configuration of a preferred embodiment of the VoIP system to which applied is the real-time communications system according to the invention.

As shown in FIG. 1, the VoIP system 10 comprises CPE (Customer Premises Equipment) units 12 and 14 as media terminal equipment, modems 16 and 18, a microphone 20, headphone sets 22 and 24 and a musical instrument 26, interconnected as illustrated. The modems 16 and 18 are connected to the IP (Internet Protocol) network via the access lines 28 and 30.

The VoIP system 10 of the embodiment is applied to a musical lesson wherein mutual communication is established by means of voice communications and also transmission and reception of MIDI data. The VoIP system 10 of the embodiment is composed of two constituent subsystems; the subsystems for one user, i.e. a student U1, and another user, i.e. an instructor U2. Both of the subsystem may include the same structural elements as each other. More specifically, the CPE units 12 and 14, modems 16 and 18, headphone sets 22 and 24 are correspondingly provided on the respective sides. Therefore, without repetition of the same description, only the constructive elements of the subsystem for the user U1 will be described in the following.

Figure 2:
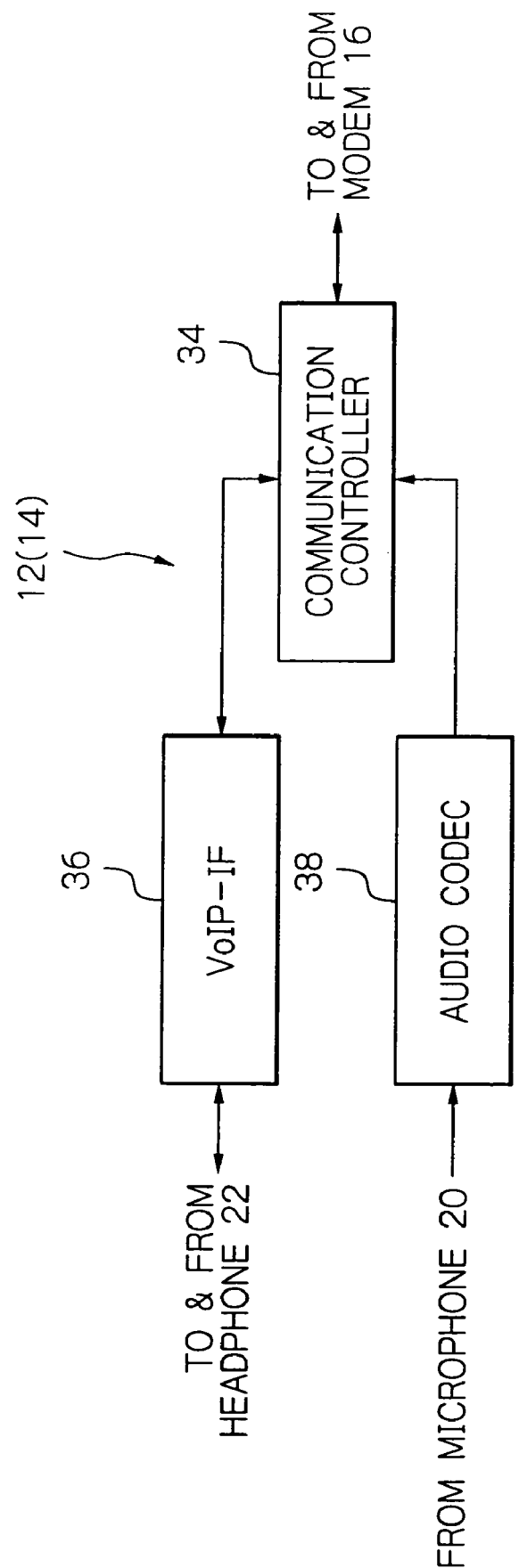
FIG. 2 is a schematic block diagram of the CPE unit included in the embodiment shown in the embodiment shown in FIG. 1.

The CPE unit 12 is a kind of network equipment which is managed by the user U1. As shown in FIG. 2, the CPE unit 12 is composed of a communication controller 34, a VoIP-IF (InterFace) circuit 36 providing a VoIP gateway function and an audio coded circuit 38. The CPE unit 12 can be distributed and/or supplied to the user U1 with free or low cost.

The communication controller 34 provides relay and synchronization functions. The relay function of the communication controller 34 is a sending function of supplied information from one subsystem to the other subsystem. The relay function is effected in the cases of relaying an IP packet 40 from the VoIP-IF circuit 36 to the modem 16, an IP packet 42 from the audio codec circuit 38 to the modem 16, and also an IP packet 44 from the modem 16 to the VoIP-IF circuit 36.

The synchronization function is to synchronize IP packets 40 and 42 with each other. The IP packet 40 which conveys audio data is sent out after a call is established by the call control procedures according to the recommendation H.323 of ITU-T (International Telecommunication Union-Telecommunication Standardization Sector) and/or the SIP (Session Initiation Protocol) etc. Therefore, the IP packet 42 which conveys musical performance data may also preferably be sent out in synchronous with the IP packet 40.

The communication controller 34 may be adapted to place a call and send out ringing, to which the user U2 then responds and off-hooks, in the call control process, and thereafter to admit the transmission of the IP packet 40 and successively admit the transmission of the IP packet 42. Besides, the VoIP system 10 may also naturally be adapted to allow the other user, i.e. the instructor U2 phones, or places a call to, the one user, i.e. the student U1. In the following, signals are designated with the reference numerals of the connections on which the signals appear.

The VoIP-IF circuit 36 provides the function equivalent to a so-called VoIP gateway. The voice uttered by the user U1 collected by the microphone 22A of the headphone set 22 is thus coded in the VoIP-IF circuit 36 to be audio data. Then, the audio data are contained in the defined area of the IP packet 40 and sent out to the IP network 32 via the communication controller 34 and the modem 16. When the one user U1 listens to the voice uttered by the other user U2, the flow procedure of audio data is opposite to above-described procedure.

Specifically, the voice collected by the microphone 24A of the headphone set 24 on the user U2 side is coded and then the IP packet 44 containing the resultant audio data is sent out from the CPE unit 14. Then, the IP packet 44 is transmitted to the VoIP-IF circuit 36 of CPE unit 12 via the modem 18, the IP network 32 and the modem 16 in the order. The audio data are taken out by the VoIP-IF circuit 12. The VoIP-IF circuit 12 decodes the audio data and outputs the decoded data by means of a loudspeaker 22B of the headphone set 22. Now, the user U1 can listen to the voice of the party connected thereto.

In this case, a coder for the coding and a decoder for the decoding are implemented by the above-described audio codec, which is arranged in the VoIP-IF circuit 36. In this case, the audio codec is adapted for coding and decoding within the analog telephone frequency band.

The audio codec circuit 38 samples and codes the playing sound collected by the microphone 20, as shown in FIG. 1, with a higher sampling rate than that of the above-described audio codec of the VoIP-IF circuit 36. The codec circuit 38 in turn takes the resultant coded performance data into the IP packet 42 and transmits the packet. The performance data mean the data representing the waveform of the playing sound 46.

As seen from the constituent elements of this illustrative embodiment, the one user U1 does not listen to the sound played by the other user U2. Consequently, the audio codec circuit 38 needs only coding facility and no decoding facility. However, in the audio codec circuit 38 a decoding facility may be provided, if necessary. In this case, it is effective to show an example or model played by the user, i.e. the instructor U2.

Further, this embodiment is structured such that the audio data are transmitted by the VoIP-IF circuit 36, while the performance data are transmitted by the audio codec circuit 38. It is however possible to enable the VoIP-IF circuit 36 to transmit the performance data as part of the audio data. In the latter case, the characteristic of the VoIP-IF circuit 36 may be modified input data to have a considerably broader bandwidth than that of the analog telephone service, namely, than the bandwidth of 300-3,400 Hz. The broad bandwidth may be, for example, 50-7,000 Hz according to the ITU-T recommendation G. 722. In broadband communications, the audio frequency signal lower than 300 Hz and higher than 3,400 Hz can be transmitted. It is thus possible to use the same structural elements as those for the voice uttered by the user U1 to transmit the playing sound of the user U1. In addition, the communication controller 34 may not be provided with synchronization function.

Broadband communications are also advantageous to improve the communications quality. Words uttered of some language, such as English, may contain frequency components higher than 3,400 Hz. When such a higher frequency band cannot be transmitted, the normal transmission of speech signals may be somewhat disturbed, comparing with the transmission of Japanese speech signals. By means of broadband communications, it is possible to improve such phenomena and its effect considerably. Especially, the broadband communications are more advantageous when at least one of the users U1 and u2 speaks English.

Alternatively, the system may be adapted to permit the user U1 to select the method of using a broadband transmission to transmit the playing sound as part of the audio data or transmitting the playing sound as the performance data separately from the audio data.

Returning now to FIG. 1, the modem 16 has a facility of line termination to terminate the access line 28. As the access lines 28 and 30, nowadays, various broadband services, e.g. ADSL (Asynchronous Digital Subscriber Line) etc., are often used. When the access line 28 is of ADSL, an ADSL modem is used of course. In addition, when the optical transmission is used for the access line 28, a media converter is used as optical termination equipment. It is clear that the access line 30 may be different in kind from the access line 28. In the embodiment, as shown in FIG. 1, the CPE unit 12 and the modem 16 are separate structural elements. However, the modem may be built in the CPE unit 12. Further, the modem may include a router facility.

The microphone 20 and the headphone set 22 are user interface devices to the user U1. The microphone 20 and the headphone set 22 are connected to the modem 16 via the CPE unit 12. The headphone set 22 is formed as a set comprising a microphone 22A, which collects voice and transduces it to a corresponding electric signal, and a speaker 22B.

In a musical lesson, the headphone set 22 may be worn on the head by the one user U1, for example, to communicate with the other user U2, while outputting the playing sound of the musical instrument played by the one user itself to have the other user U2 listen to the sound. The voice uttered by user U1 is collected by the microphone 22A of the headphone set 22 and then coded into the form of audio data by the audio codec of the CPE unit 12, and the data are contained in the IP packet 40 and delivered to the modem 18 of the party connected via IP network 32.

The musical instrument 26 outputs the playing sound 46 played by the user U1. The microphone 22A collects the playing sound 46, and thus obtained analog signal is supplied to the CPE unit 12. The CPE unit 12, by means of the audio codec circuit 38, samples and codes the analog signal with a higher sampling frequency than that of the audio codec used for the analog telephone service, and takes the coded data into the IP packet 42. From the CPE unit 12, the IP packet 42 is supplied to the IP network 32 and then via the network 32 to the modem 18 on the other user site. In this arrangement provided with the microphone 20, consequently, a MIDI-type musical instrument may not be used but any type of musical instruments can be used. Therefore, the user U1 can freely use any type of musical instruments, ordinary or electronic, for example, a keyboard, a piano, a Chinese violin etc.

When the musical instrument is an electronic musical instrument provided with an analog signal output terminal, instead of the microphone 20, an analog input terminal for connecting the analog signal output terminal, not shown, to the CPE unit 12 may be provided in the CPE unit 12, and thus media data of the MIDI standard can be outputted, as described later.

The IP network 32 is managed and operated by a specific common carrier or ISP (Internet Service Provider). An IP protocol is used in the network layer of an OSI (Open Systems Interconnection) reference model. In the IP network 32, an IP telephone service based upon the VoIP technology is therefore provided. It does not matter that the IP network 32 may include various kinds of network equipment, such as a router, an L2 switch, not shown, and other Internet connections not shown in FIG. 1. In addition, needless to say, there may be an SIP server and/or an H.323 gate keeper, etc., not shown in FIG. 1, in the IP network 32 to execute the call control procedure.

Next, the operation of the VoIP system 10 will be described. After the user U1 has disposed the microphone 20 adjacent to the musical instrument 26 and worn the headphone set 22 on his or her head, he or she telephones the other user U2, i.e. the instructor by inputting the telephone number of the user U2. In order to input the desired telephone number, some suitable user interface may preferably be provided. As such a user interface, for example, a telephone set or the page of a Web site presented on a display device may be used.

Such a Web page is prepared for dialing by the user U1 when he or she would like to receive the musical lesson, and contains information representative of a specific instructor with an abbreviation, such as "U2", his or name and telephone number. In the CPE unit 12, a Web Portal software is preferably installed which is adapted for displaying the Web page for dialing. The Web Portal, a kind of Web browsers, may be the same as ordinary Web browsers except for its provision of the function of software dialing.

When the Web Portal is used, display equipment and a pointing device such as a mouse are required to be interconnected to the CPE unit 12, a Web server facility which supplies the Web page for dialing is required to be arranged in the IP network 12. In that case, the user U1 will be able to dial the user U2 in a simplified operation, for example, by pointing the icon representative of a desired called party and clicking his or her mouse.

When the user U1 inputs the telephone number of the called party to start the calling procedure, the called user U2 off-hooks on the side of the CPE unit 14 to respond to the call, and wears the headphone set 24 to his or her head. Now, real-time voice transmissions will be allowed between the users U1 and U2 by means of VoIP communications. The voice transmissions are established by transmitting IP packets 40 and 44 over the IP network 32.

During the voice transmissions proceeding, the calling user U1 plays his or her musical instrument 26 and the microphone 20 collects the playing sound 46. The IP packet 42 containing performance data obtained from the playing sound 46 in the CPE unit 12 is then transmitted to the called user U2.

Naturally, the audio data during the voice transmissions is transmitted on the basis of real-time transmission without resending control. However, in the application in which performance data packets are transmitted separately from audio data packets, the IP packet 42 containing the performance data may be transmitted on the basis of non-real-time transmission with resending control. With the non-real-time transmission, resending control is so preferable that, if any packet loss has occurred on the IP network 32, it is possible to perfectly reproduce a playing sound 46 without interruption. However, the mutual communication between the users U1 and U2 is promoted simultaneously with the proceeding of close transmission of both performance and audio data. It is therefore preferable, when real-time capability is more significant, to transmit the IP packet 42 also on the basis of real-time transmission without resending control.

In addition, the system may be adapted to allow the user U1 or U2 to appropriately select the transmission type from the real-time and non-real-time transmissions for transmitting the IP packet 42. With such a selective transmission type available, the VoIP system 10 can decide to adaptively use either one of the two transmission types in dependence upon the situation where packet loss occurs.

With the VoIP system 10 with the resending control, when packet loss has occurred, the CPE unit 12 on the sender side sends out again the same IP packet 42 as the lost one. The CPE unit 14 of the destination side waits for the arrival of the resent IP packet 42 and then reproduces and outputs the playing sound 46. In this case, the most accurate real-time capability is not maintained. However, the resending control of the VoIP system 10, as described above, has considerably higher real-time capability than the method of sending the storage medium storing MIDI data via mail. Thus, although it is a kind of non-real-time communications, it can be said that the almost satisfactory real-time capability is maintained.

In any case, while the other user, i.e. the instructor, U2 listens to the playing sound to catch fine change in the playing sound and gives a suitable indication about it, the one user, i.e. the student, U1 can respond to this indication and repeat the playing of his or her musical instrument with the playing way modified delicately, thus carrying out a remote musical lesson. Even if the sites of the users U1 and U2 are far from each other, a musical lesson will be accomplished almost equivalently to a face-to-face lesson for a long time without moving. For example, the lesson is very advantageous when the user U1 lives in his or her mother country and the user U2 lives in a foreign country. Further, when the languages of the users U1 and U2 are different from each other, the installation of a machine translation facility in at least one of the CPE units 12 and 14 may accomplish real-time communications through the machine translation.

By utilizing the VoIP system 10 stated above, various musical lesson services can be provided without moving, so that low lessen fees and various services will easily be available from many instructors in the world in a short time. When the student is too young and/or the instructor is too old to move easily, the embodiment can supply services more effectively. Thus, by improving the communications quality and utilizing plural sorts of information, such as audio and performance data, to promote mutual communications on a real-time basis, advantageous remote musical lessons will be accomplished.

Next, an alternative embodiment of the VoIP system 10 will be described, to which applied is the real-time communications system of the invention. Hereafter, in order to avoid repetition of the redundant description, only the points will be described which are different from the previous embodiment. Like structural elements are designated with the same reference numerals, on which the repetitive description will be omitted. The VoIP system in this alternative embodiment is provided with a USB (Universal Serial Bus)-MIDI interface 48 between the MIDI cable CPE unit 12 and the music instrument 26, as shown in FIG. 3.

The USB-MIDI interface 48 provides the function for the parallel-to-serial conversion of the MIDI data supplied from the musical instrument 26 via 5-pin DIN (Deutsche Industrie Normenausschuss) cable to its input connecter and outputting the converted data. The MIDI is a protocol which is used for connecting synthesizers with each other or a computer to a synthesizer, and by which transmission is carried out at the rate of 31,250 bps, for example. The data transmitted on a MIDI cable are not sampled data like PCM (Pulse Code Modulation), but include the information of tone and musical interval. The information is transmitted by the MIDI data described in the command format defined by the MIDI protocol, rather than performance data representing the waveform of playing sound of the musical instrument 26. Commands of MIDI data are generally messages of 1, 2 or 3-byte length.

Figure 4:
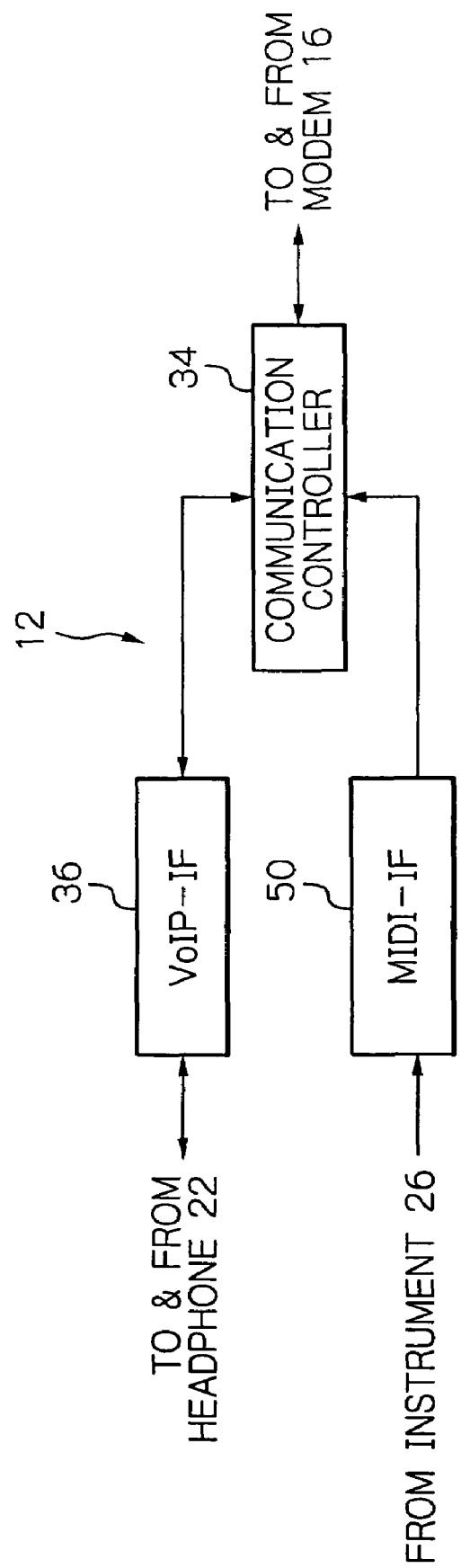
FIG. 4 shows in a block diagram a schematic configuration of the CPE unit used by the user U1 in the embodiment shown in FIG. 1.

The CPE unit 12 of the VoIP system 10 comprises, as shown in FIG. 4, a MIDI-interface (IF) circuit 50 instead of the audio codec circuit 38 included in the previous embodiment. The MIDI-IF circuit 50 provides the function of assembling IP packets 42 containing the MIDI data and sending out them. In this embodiment, the information representing the playing sound is transmitted in the form of MIDI data. The requirement of broadband communications is therefore decreased in which the VoIP-IF circuit 36 transmits the signals of audible frequency bands lower than 300 Hz and higher than 3,400 Hz as with the previous embodiment. Furthermore, the MIDI data treated in the alternative embodiment are numerical data, and the normal reproduction of playing sound on the side of the CPE unit 14 does not tolerate even one bit error mixed or dropped. That makes the resending control of IP packets preferable.

Figure 3:
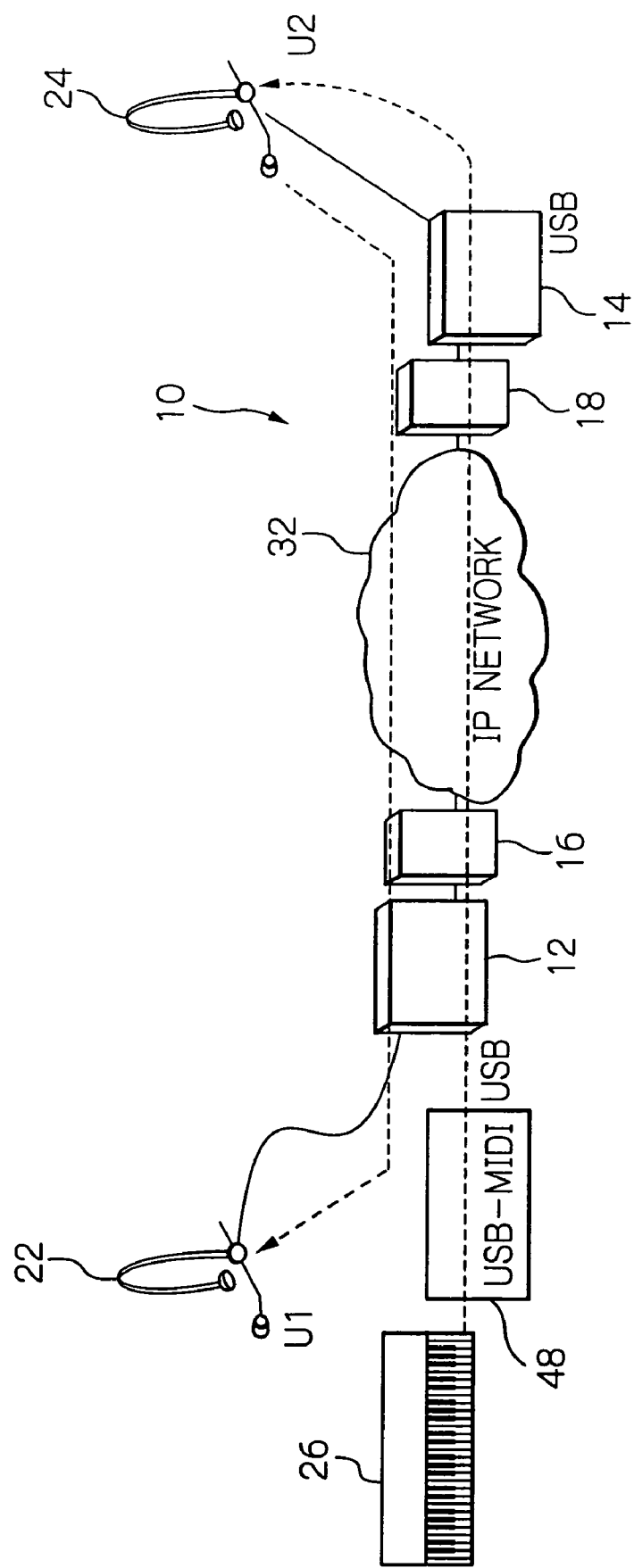
FIG. 3 shows a schematic configuration of an alternative embodiment of the VoIP system to which the real-time communications system is applied according to the invention.

Comparing both data treated in the embodiments shown in FIGS. 1 and 3 with each other in respect of the same size of the data, the numerical data treated in the alternative embodiment can represent voice or sound over a considerably longer period of time. Therefore, if the IP packet 42 has been resent with some time delay, the user U2 may possibly recognize the time delay negligible as a time lag between the audio output and the reproduced playing sound output on the side of the user U2.

Figure 5:
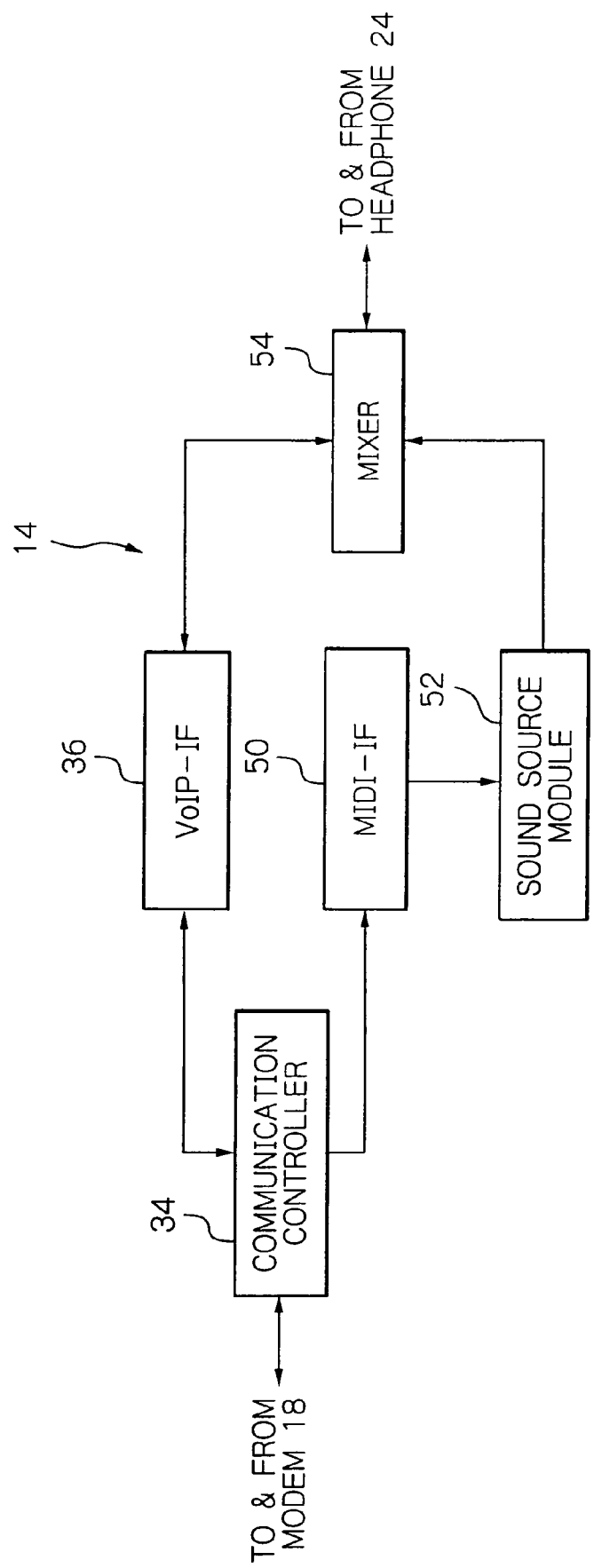
FIG. 5 shows in a block diagram a schematic configuration of the CPE unit used by the user U2 in FIG. 1.

The CPE unit 14 is shown, for instance, in FIG. 5, which is adapted to receive the IP packet 42 containing MIDI data together with the IP packet 40 containing audio data. The CPE unit 14 as shown in FIG. 5 comprises a sound source module 52 and a mixer 54 as well as the same structural elements as with FIG. 4. The sound source module 52 is a so-called MIDI sound source module and provides the function of reproducing the playing sound represented by the MIDI data taken from the received IP packet 42 by the MIDI-IF circuit 50. The sound source module 52 includes a ROM (Read Only Memory) which stores information such as tone. The stored information is read out according to the MIDI data to reproduce and output the playing sound.

The mixer 54 has the function of mixing the decoded signal representing the voice uttered by the user U1 supplied from the VoIP-IF circuit 36 with the reproduced output signal representing playing sound supplied from the sound source module 52 to output the mixed result to the user U2 for listening. The mixer 54 also supplies the voice uttered by the user U2 to the VoIP-IF circuit 36. The VoIP-IF circuit 36 produces the IP packet 40 containing the signal of a voice uttered by the user U2, and transmits the IP packet 40 toward the CPE unit 12.

The VoIP system 10 used in this embodiment implements real-time mutual communication and effective remote musical lesson as with the system of the previously described embodiments. The system 10 of the embodiment can supply a playing sound of higher quality to the user U2 for listening by means of resending control of the IP packet 42 containing MIDI data.

Next, another alternative embodiment of the VoIP system 10 will be described to which the real-time communications system of the invention is applied. This embodiment has the features of transmitting from the user U2 his or her playing sound as a model and using not only auditory information but also visual information, thus making mutual communication stronger. The VoIP system 10 is shown in FIG. 6 according to the embodiment.

Figure 6:
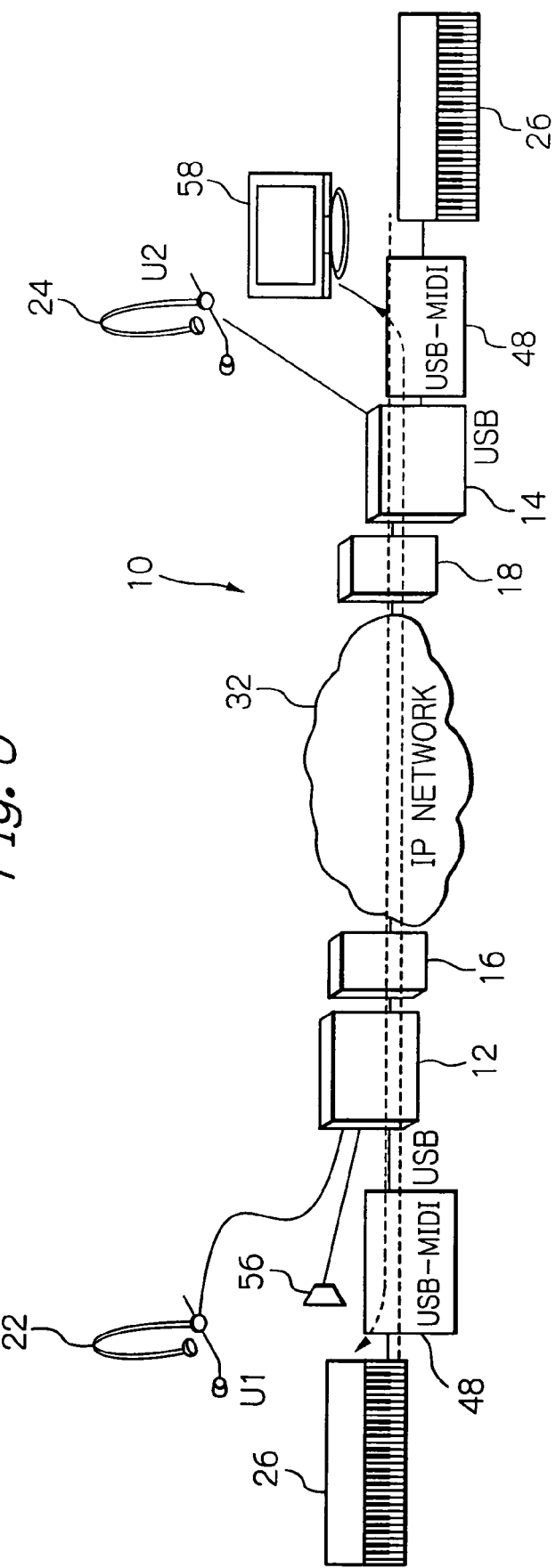
FIG. 6 shows, like FIG. 3, a schematic configuration of another alternative embodiment of the VoIP system to which the real-time communications system is applied according to the invention.

The VoIP system 10 as shown in FIG. 6 comprises the CPE unit 12 which has the same structure as the CPE unit 14 in FIG. 5, and also arranges a USB camera 56 which captures scenes of the user U1 playing his or her musical instrument 26 to produce visual information onto the user U1. In addition, in the VoIP system 10 the CPE unit 14 of the user U2 has a display 58 connected. In this embodiment, the musical instrument 26 is a keyboard. Therefore, the camera 56 is primarily arranged to shoot the finger motion of the user U1. The image data generated by the camera 56 are stored in an IP packet together with conversation audio data and MIDI data, and then transmitted to the user U2 over the IP network 32. From the transmitted IP packet, audio data, MIDI data and image data are extracted by the CPE unit 14. The obtained image data are supplied to the display 58. Thus, the display 58 shows the finger motion of the user U1. The user U2 can thus watch the finger motion of the user U1 on the keyboard represented by the image data.

On the other hand, the other user, or instructor, U2 may play the musical instrument 26 which is the same as the musical instrument 26 of the one user U1 to show an example. MIDI data representative of the sound resultant from his or her playing are transmitted to the CPE unit 12 of the user U1. The CPE unit 12 supplies the MIDI data to the headphone set 22 via MIDI-IF circuit 50, sound source module 52 and mixer 54. Now, the user U1 can listen to the example or model performance.

In this embodiment, it is possible to use non-real-time transmission with resending control to transmit the IP packet containing the image data. It is however also preferable to use real-time transmission without resending control. Further, in this embodiment, the image data transmission is described only on the direction from the student to the instructor. The direction is however not limited to that stated above, but a bi-directional image transmission is possible wherein a visual playing example can be transmitted to the student. In this case, the VoIP system 10 may add a USB camera 56 and a display 58 to the premises of the users U2 and U1, respectively. By transmitting visual information as described above, the level of mutual understanding between the student and the instructor can become closer to that of a face-to-face musical lesson.

Next, still another alternative embodiment of the VoIP system 10 will be described, to which the real-time communications system of the invention is applied. In this embodiment, a multiple-to-one musical lesson may be accomplished by plural students and one instructor. In this case, the new user U3 is a student who receives a musical lesson supplied from the user, i.e. instructor, U2, as with the user U1. Therefore, the structural elements of the premises of the user U3 may be absolutely the same as those of the user U1.

Figure 7:
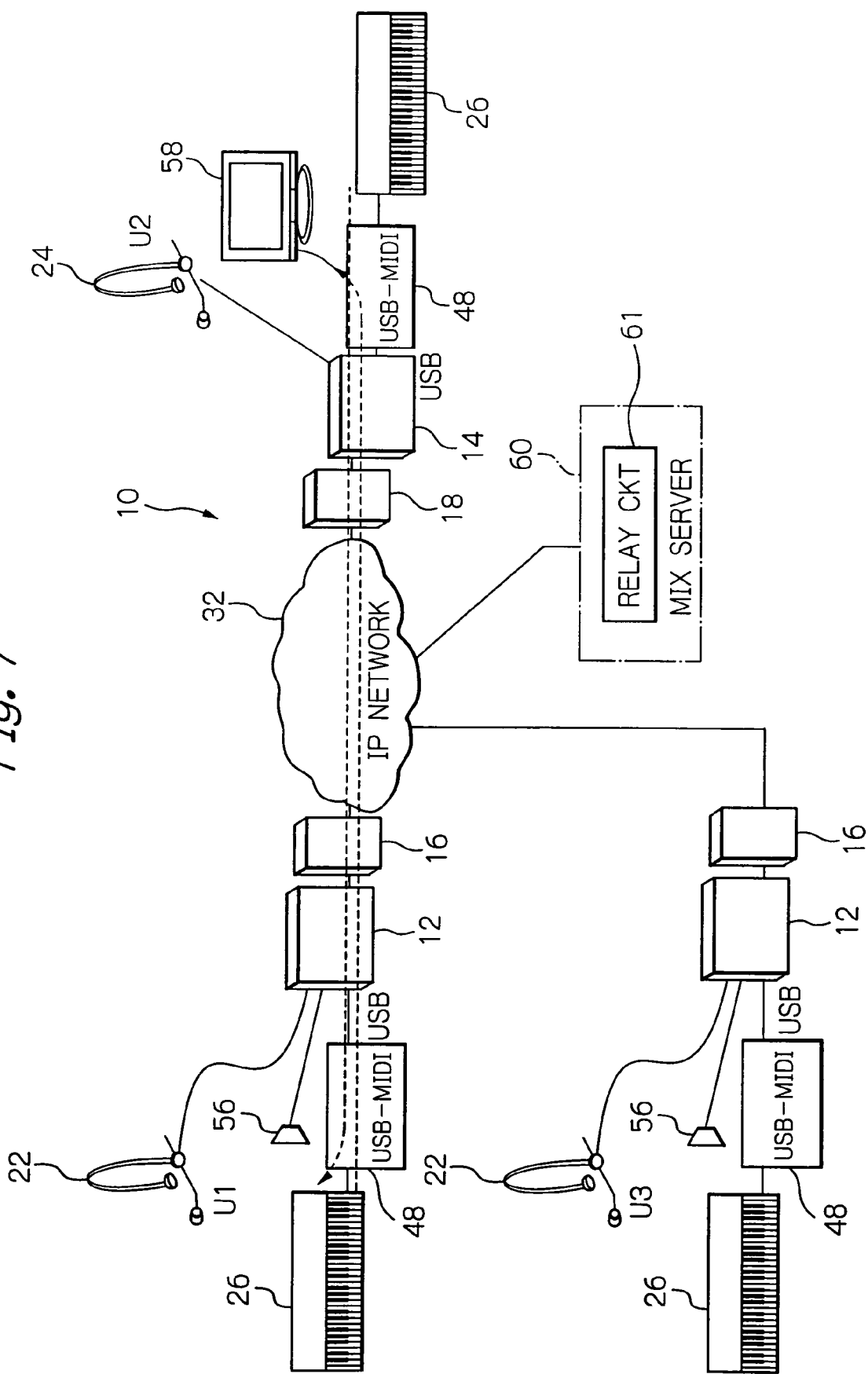
FIG. 7 shows, like FIG. 3, a schematic configuration of still another alternative embodiment of the VoIP system to which the real-time communications system is applied according to the invention in the one-to-multiple form.

The VoIP system 10 according to the embodiment, as shown in FIG. 7, is provided with a mixing (MIX) server 60 on the IP network 32. The mixing server 60 comprises a relay circuit 61, and other equipment, such as a sound source module and a mixer, not specifically shown in FIG. 7. Therefore, both CPE units 12 and 14 may be composed of the same structural elements as shown in FIG. 4. However, the MIDI-IF circuit 50 may comprise a transmission facility only. Thus, with the VoIP system 10, the relay circuit 61 of the mixing server 61 mixes the performance results of the musical instruments 26 played by the two students U1 and U3 with each other, and transmits the mixed contents to the instructor U2, while transmitting the speech signal and the playing example received from the instructor U2 to the respective students U1 and U2. That makes the instructor U2 listen to a playing sound as if the students U1 and U3 played the physically single music instrument 26 with their four hands.

In this embodiment, both students use keyboards of the same standard as the musical instrument 26. However, needless to say, they may use musical instruments of different standards. In an application where the user U2 is able to listen to playing sounds by three or more students simultaneously, he or she may conduct a group of students to play a symphony, for example. The mixing server 60 may supply the respective students with the mixed output for the sake of listening. Likewise, the system may be adapted for mixing of the voice and playing sound of those students with each other to establish simultaneous communication between the students who join one and the same musical lesson. The system may also be adapted to accomplish communication between the instructor and each student as well as between the students for the sake of personal exercises. Thus, the VoIP system 10 may be used not only for the one-to-one musical lesson but also for the multiple-to-one musical lesson.

Figure 8:
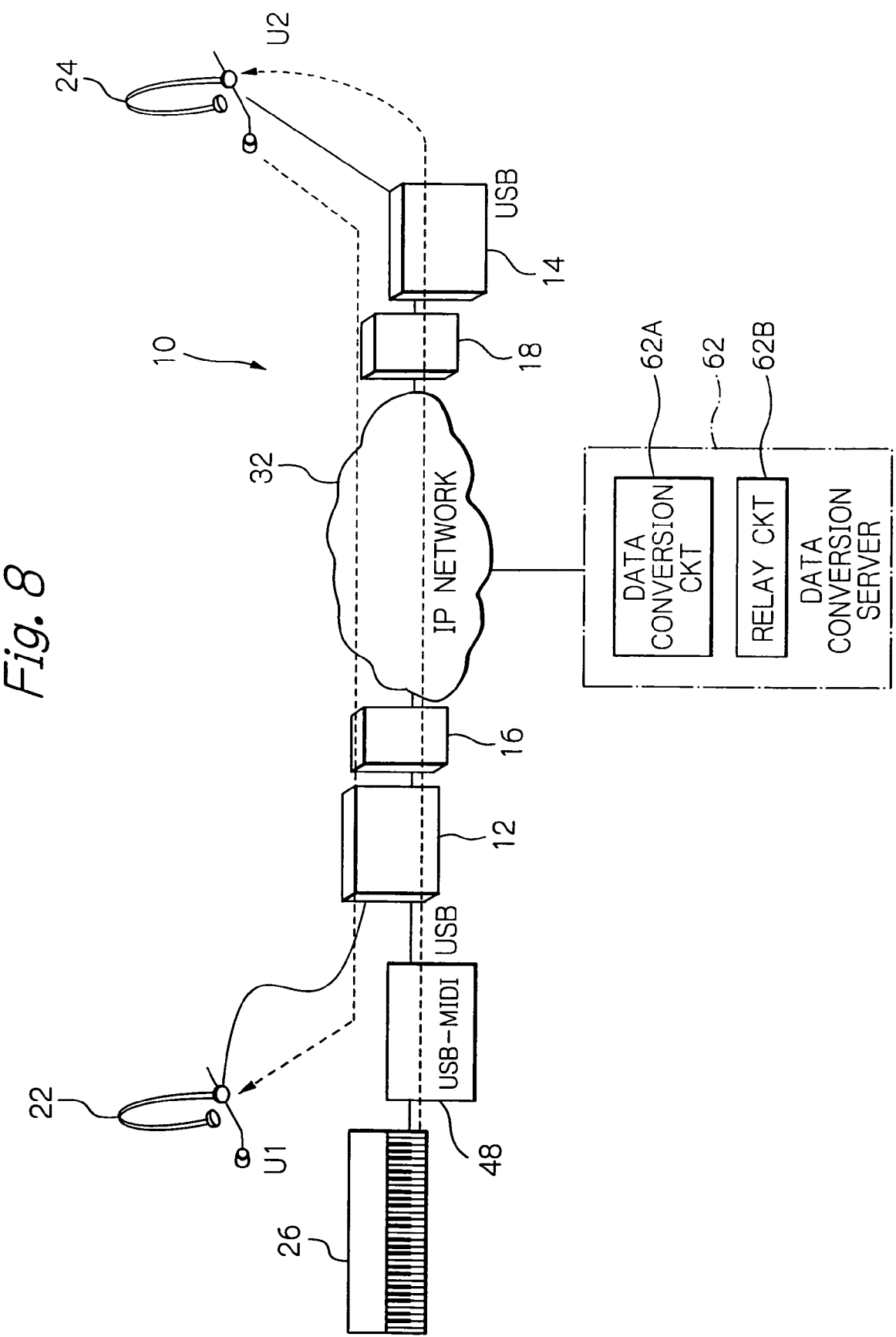
FIG. 8 shows, like FIG. 3, a schematic configuration of a further embodiment of the VoIP system to which the real-time communications system is applied according to the invention.

Next, a further alternative embodiment of the VoIP system 10 will be described, to which applied is the real-time communications system of the invention. The VoIP system 10 as shown in FIG. 8 corresponds to the system provided with a data conversion server 62 on the IP network 32 shown in FIG. 3. The data conversion server 62 comprises a data conversion circuit 62A, which is adapted to convert the MIDI data contained in the IP packet 42 transmitted from the CPE unit 12 into the same audio data, i.e. the waveform data of playing sound, as the audio data coded by the VoIP-IF circuit 36. The server 62 also comprises a relay circuit 62B, which is adapted to transfer or relay the data to the CPE unit without converting the data. The data conversion server 62 transmits the IP packet containing the thus converted audio data to the CPE unit 14 by means of its relay circuit 62B.

By using this arrangement, the CPE unit 14 of the user U2 may not be compatible with the MIDI standard and no MIDI sound source module is required, thus rendering the arrangement simplified.

When the access lines 28 and 30 are asymmetric transmission rate lines, such as ADSL, of which up- and down-loading rates are asymmetric with respect to each other so that its up-loading bandwidth is narrower than its down-loading bandwidth, the conversion of MIDI data into audio data by means of the data conversion server 62 on the IP network 32 will render the size of the data increased. However, since the increase occurs in the downward direction, the conversion well matches to the asymmetric-rate access lines and is even effective. The reason is that, on the one hand, the required transmission size is smaller when the data are transmitted from the CPE unit 12 to the data conversion server 62 over the access line 28 in the up-loading direction, whereas, on the other hand, the required transmission size is larger when the converted data are transmitted from the data conversion server 62 to the CPE unit 14 over the access line 30 in the down-loading direction.

When the data conversion server 62 or the mixing server 60 is used, the position at which the server is located possibly increases the hops to cause some disadvantages such as an increase of the time delay in the real-time communications and the instable communication quality. The location of the server should therefore carefully be selected.

Further, in FIG. 3, there is disposed the USB-MIDI interface as interface equipment between the musical instrument 26 and the CPE unit 12. The function of the interface equipment may be provided in the musical instrument 26 or in the CPE unit 12. Furthermore, it is clear that the use of USB is not indispensable. In the above description, for example, the headphone set 22 may be replaced with a hands-free phone device.

Figure 9:
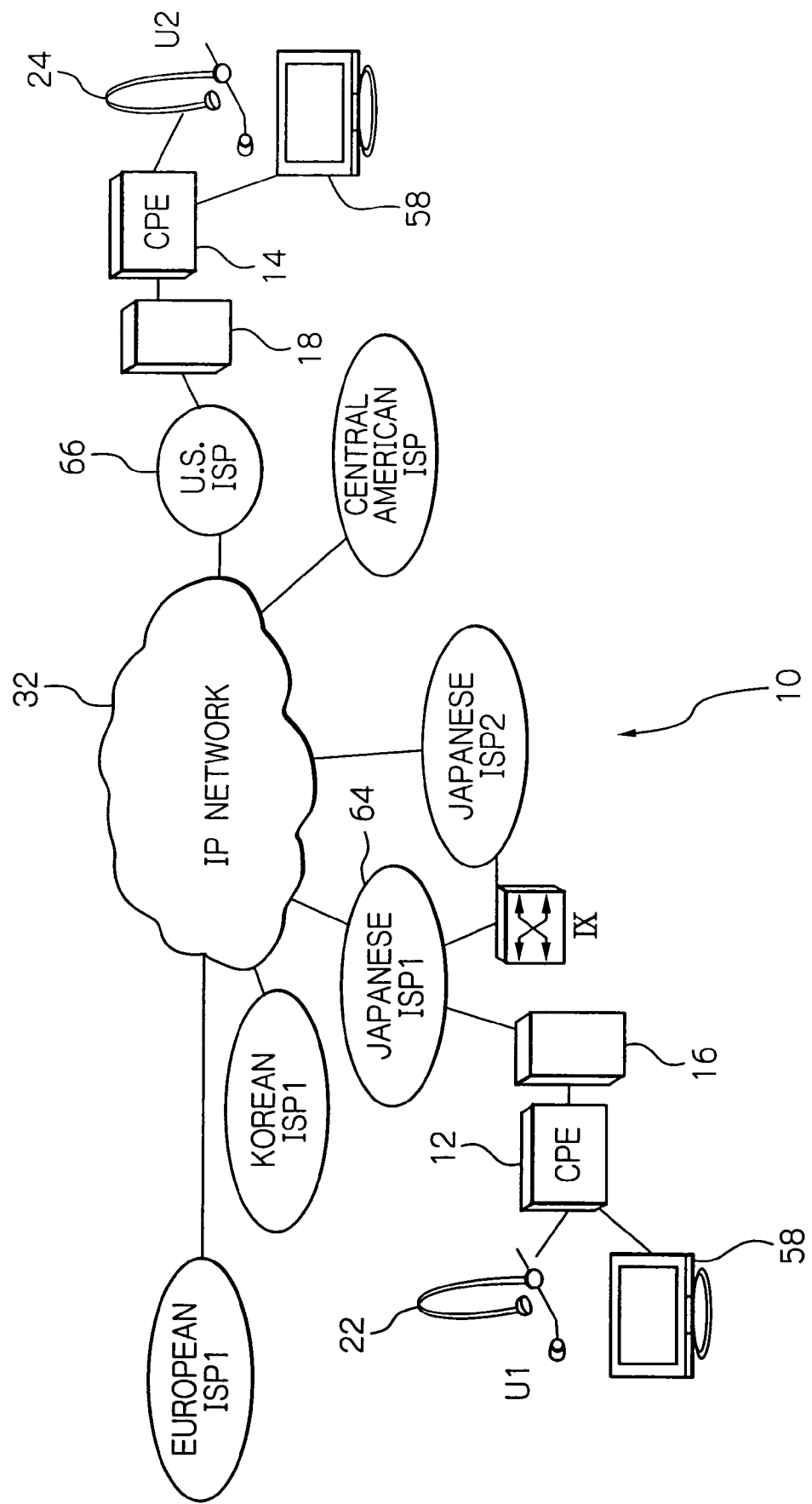
FIG. 9 shows in a block diagram a schematic configuration of network connections used in a still further alternative embodiment of the VoIP system to which applied is the real-time communications system according to the invention.

Between the premises of the users, a network other than the single IP network 32 may be located, as shown in FIG. 9. Generally, when a student and an instructor who live far from each other communicate in a musical lesson, it is usual to use multiple networks in addition to, or instead of, the IP network 32. As one of such multiple networks, an ISP network, or "AS", may be applicable, for example.

Figure 10:
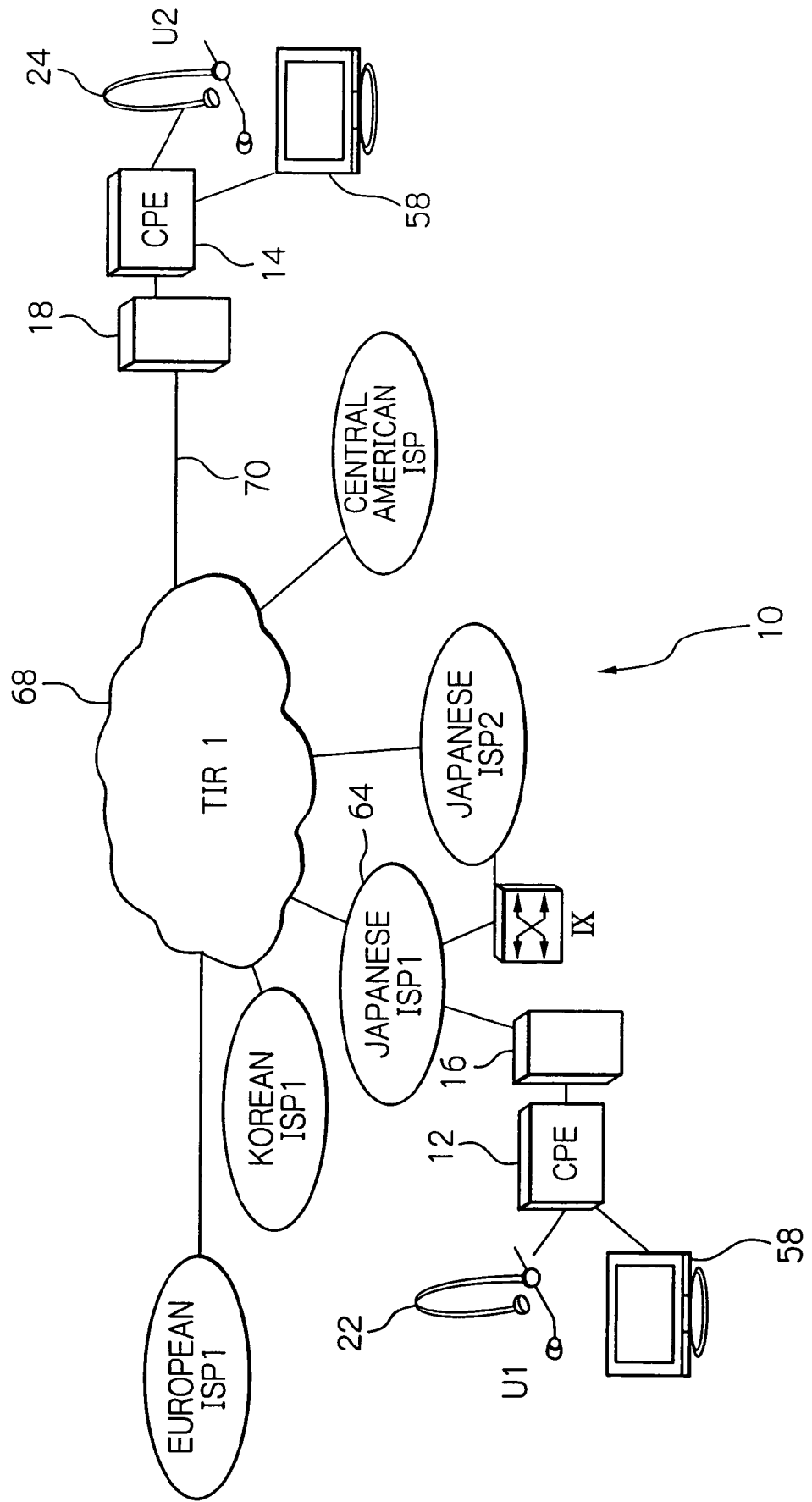
FIG. 10 shows in a block diagram, like FIG. 1, a schematic configuration of experimental network connections used in a still another alternative embodiment of the VoIP system to which the real-time communications system is applied according to the invention.

As shown in FIG. 9, when the one user U1 who lives in Japan and the other user U2 who lives in U.S.A communicate with each other in a musical lesson, the one user U1 may communicate with the other user U2 over a Japanese ISP network ISP1 64, the IP network 32 and a U.S. ISP network 66 to thereby receive the music lesson. Specifically, the VoIP system 10 having the structure as shown in FIG. 10 is arranged in order to stably enhance the communications quality. This arrangement of the VoIP system 10 was confirmed by a simple communications experiment done by the user U1 in Japan communicating with the other user U2 over the ISP1 64, a TIR1 network 68 and a private line 70. The TIR1 network 68 is one of the primary providers.

The TIR1 network is a kind of ISP networks, and operated by a very big major U.S. ISP. As known well, the Internet is an aggregate of ISP networks, and the hierarchy architecture is established between the ISP networks depending on the sorts of path information on which routing is conducted. The TIR1 network is a ISP network positioned in the highest layer of the hierarchy architecture, and maintains path information, by which routing is conducted to any ISP network on the Internet, even to any autonomic network AS.

If users are interconnected to an ISP network other than the TIR1 network 68, some IP packets having the address thereof failing to locate appropriate path information may be transferred to a different ISP network in order to find out appropriate path information. With the system structured as shown in FIG. 10, a student is able to receive real-time remote musical lessons from many instructors in the world, while an instructor is able to give real-time lessons to many students in the world.

In addition, the present invention is applicable to not only musical instrument lessons but also vocal music and karaoke lessons. Although the IP protocol is used in the afore-described illustrative embodiments, the protocol used in the network layer of OSI reference model is not necessarily limited to the IP protocol. For example, the IPX protocol is applicable.

Furthermore, the illustrative embodiments of the invention are implemented by means of hardware configuration. It is however also possible to implement the invention by means of software configuration. Almost all of the functions implemented in the form of hardware may also be accomplished by software configuration, and vice versa.

In the arrangements described above, while the CPE units 12 and 14 are connected to the IP network 32 as calling and called parties, respectively. The VoIP-IF circuits 36 of the CPE units 12 and 14 conduct at least one of the coding process to the first audio frequency signal and the restoration process to media information to transmit the media information generated by the process to the party connected thereto and restore the first audio frequency signal from the media information received from the other party connected to output the signal. The audio codec circuits 38 conduct at least one of the sending out of the received music data to the party connected thereto and the conversion of the music data received from the party connected thereto into the second audio frequency signal. Each of the CPE units 12 and 14 resultantly outputs sounds which have the transmission characteristics thereof combined from the first and second audio frequency signals, thus promoting mutual communication between the users. Real-time communications are accomplished with a simplified arrangement with the improved quality of communications.

The VoIP system 10 provides the mixing server 60 on the IP network 32. The relay circuit 61 of the mixing server 60 relays or transfers data transmitted from the CPE unit 12 of the users U1 and U3 on the basis of a specific protocol to the CPE unit 14 of the user U2. The relay circuit 61 also relays or transmits data transmitted from the CPE unit 14 on the basis of a specific protocol to the CPE unit 12 of the users U1 and U3. That can simplify the configuration of the CPE units and easily achieve multiple-to-one communications.

In an application where at least one of the CPE units is the CPE unit 14 of which the VoIP-IF circuit 36 comprises only the transmitting and receiving functions of music data, the VoIP system 10 may be provided with the conversion server 62 on the IP network 32. The data conversion circuit 62A of the conversion server 62 converts music data into an audio frequency signal of the MIDI standard, which would otherwise have been implemented by the CPE unit 14, and the relay circuit 62B inserts or associates, e.g. music data received from the CPE unit 12 into or with the audio frequency signal of the MIDI standard thus converted, and relays the inserted data to the CPE unit 14 having no interface circuit. That can simplify the configuration of the CPE unit 14 as well as the overall system configuration.

The VoIP-IF circuit 36 is used as circuitry which carries out, in real-time communications, either one of the generation of coded image media information on the basis of an image signal received from the USB camera 56 and the restoration of the original image signal from the coded image media information. It is thereby possible to obtain visual information on the real-time basis, display the image, and enhance the communications quality.

The CPE unit 14 has the mixer 54 adapted to mix a VoIP audio frequency signal obtained by the restoration from audio frequency media information with the audio frequency signal of the MIDI standard converted and obtained from the music data to thereby provide the headphone set 24 with the mixture sound.

The VoIP system 10 is applied to the network which is an aggregate of plural element networks operated by different organizations, wherein there is an hierarchy architecture formed in the element networks depending on the scope of path information maintained by each element network in the path control process between the element networks. At least one of the media terminal units to be communicated with resides in the first layer of element networks positioned in the highest layer of the hierarchy architecture and maintaining by itself path information relating to all other element networks. It is therefore not necessary to pass IP packets through other ISP networks which specify the path information, thus considerably contributing to establishing real-time communications.

According to the CPE units 12 and 14 to which the invention is applied, the VoIP-IF circuit 36 performs at least one of the coding process to the first audio frequency signal and the restoration process to the media information to output the media information generated from the process and the first audio frequency signal restored from the media information supplied. The media codec circuit 38 performs at least one of the outputting of received music data and the conversion of music data into the second audio frequency signal to thereby produce sounds which have transmission characteristics combined from the first and second audio frequency signals from the respective CPE units. The communications quality can thus be enhanced and the real-time mutual understanding can be promoted by using plural kinds of information.

The entire disclosure of Japanese patent application No. 2003-400080 filed on Nov. 28, 2003, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communications system for use with an internet protocol network, wherein student and instructor terminal units are used by a student and an instructor to communicate with each other at least one of transmission and reception, comprising:
    an information conversion circuit in the student terminal unit for executing in real-time communications generation of voice information by coding for transmission via voice packets to the instructor terminal unit and restoration of voice information received via voice packets from the instructor terminal unit; and
    an interface circuit in the student terminal unit for executing in real-time communications conversion of music data into music packets for transmission to the instructor terminal unit; and
    an information conversion circuit in the instructor terminal unit for executing in real time communications generation of voice information by coding for transmission via voice packets to the student terminal unit and restoration of voice information received via voice packets from the student terminal unit,
    wherein the information conversion circuit in each of the student and instructor terminal units comprises:
        a communication controller having a relay function for sending information between the student and instructor terminal units and a synchronization function for synchronizing an input or output packets with each other,
        a VoIP (Voice over Internet Protocol) interface circuit having a VoIP gateway function for modifying input data to have a broader bandwidth than that of an analog telephone service, and
        an audio codec circuit for sampling and coding a sound collected at a higher sampling rate than that of an audio codec of said VoIP interface circuit, and
    wherein the communication system uses a frequency signal having a broader bandwidth than that of an analog telephone service, and allows the users to select a transmission mode from real-time and non-real-time transmissions.

2. The system in accordance with claim 1, further comprising a mixing sewer provided on the network, wherein said mixing server comprises a first relay circuit for relaying packets from the student and instructor terminal units to a third terminal unit and for relying packets from the third terminal unit to the student and instructor media terminal units.

3. The system in accordance with claim 2, wherein said interface circuit of the student terminal unit has only transmission and reception functions of the music data, and
    said system is provided on the network with a conversion server for converting and relaying the music packets.

4. The system in accordance with claim 3, wherein said instructor terminal unit further comprises a mixer for mixing the voice information obtained by restoration of voice packets from the student terminal unit with the music data obtained by conversion of the music packets from the student terminal unit.

5. The system in accordance with claim 4,
    wherein the network is an aggregation of a plurality of element networks controlled by different organizations,
    wherein the element networks form a hierarchy architecture according to a scope of path information maintained in path control between the element networks, and
    wherein at least one of said student and instructor terminal units is placed in a highest layer of the hierarchy architecture and interconnected to a first layer of the element networks which holds by itself the path information of the remaining element networks.

6. The system in accordance with claim 2, wherein said information conversion circuit of at least one of the student and instructor terminal units executes, in real-time communications, either one of generation of image media information by coding.

7. The system in accordance with claim 1, wherein said interface circuit of the student terminal unit has only transmission and reception functions of the music data, and
    said system is provided on the network with a conversion server for converting and relaying the music packets.

8. The system in accordance with claim 7, wherein said information conversion circuit of at least one of the student and instructor terminal units executes, in real-time communications, either one of generation of image media information by coding and restoration of an original image signal.

9. The system in accordance with claim 8, wherein said instructor terminal unit further comprises a mixer for mixing the voice information obtained by restoration of voice packets from the student terminal unit with the music data obtained by conversion of the music packets from the student terminal unit.

10. The system in accordance with claim 9,
wherein the network is an aggregation of a plurality of element networks controlled by different organizations,
wherein the element networks form a hierarchy architecture according to a scope of path information maintained in path control between the element networks, and
wherein at least one of said student and instructor terminal units is placed in a highest layer of the hierarchy architecture and interconnected to a first layer of the element networks which holds by itself the path information of the remaining element networks.

11. The system in accordance with claim 1, wherein said information conversion circuit of at least one of the student and instructor terminal units executes, in real-time communications, generation of image media information by coding.

12. The system in accordance with claim 1, wherein said instructor terminal unit further comprises a mixer for mixing the voice information obtained by restoration of voice packets from the student terminal unit with the music data obtained by conversion of the music packets from the student terminal unit.

13. The system in accordance with claim 12,
wherein the network is an aggregation of a plurality of element networks controlled by different organizations,
wherein the element networks form a hierarchy architecture according to a scope of path information maintained in path control between the element networks, and
wherein at least one of said student and instructor terminal units is placed in a highest layer of the hierarchy architecture and interconnected to a first layer of the element networks which holds by itself the path information of the remaining element networks.

14. The system in accordance with claim 1,
wherein the network is an aggregation of a plurality of element networks controlled by different organizations,
wherein the element networks form a hierarchy architecture according to a scope of path information maintained in path control between the element networks, and
wherein at least one of said student and instructor terminal units is placed in a highest layer of the hierarchy architecture and interconnected to a first layer of the element networks which holds by itself the path information of the remaining element networks.

15. The communication system of claim 1, wherein the first terminal unit further comprises an audio transducer that generates sound, and means for generating audio signals that are supplied to the audio transducer from VoIP packets received over the IP network from the second terminal unit.

16. The system according to claim 1, wherein the interface circuit has a higher sampling rate than the information conversion circuit.

17. A terminal apparatus, interconnected to a network based upon an internet protocol, for communicating with a party connected to said apparatus on a real-time basis, comprising:

an information conversion circuit for executing in real-time communications generation of voice information by coding for transmission via voice packets to the party and restoration of voice information received via voice packets from the party; and
an interface circuit for executing conversion of music data into music packets for transmission to the party,
wherein the information conversion circuit includes:
a communication controller having a relay function for sending information to the party and receiving information from the party and a synchronization function for synchronizing an input or output packets with each other,
a VoIP (Voice over Internet Protocol) interface circuit having a VoIP gateway function for modifying input data to have a broader bandwidth than that of an analog telephone service, and
an audio codec circuit for sampling and coding a sound collected at a higher sampling rate than that of an audio codec of said VoIP interface circuit, and
wherein the terminal apparatus uses a frequency signal having a broader bandwidth than that of an analog telephone service, and allows selection of a transmission mode from real-time and non-real-time transmissions.

18. The apparatus in accordance with claim 17, further comprising a mixer for mixing voice information obtained by restoration from voice packets with music data obtained from music packets.

19. A communication system for use with an IP network, comprising:
a first terminal unit that is connectable to the IP network; and
a second terminal unit that is connectable to the IP network to communicate with the first media terminal unit,
wherein the first terminal unit comprises:
first means for inserting MIDI data into music packets that are sent to the second terminal unit over the IP network;
a microphone; and
second means for generating VoIP (Voice over Internet Protocol) packets from signals generated by the microphone, the VoIP packets being sent to the second terminal unit over the IP network in synchronism with the music packets,
wherein the first terminal unit further comprises a communication controller having a relay function for sending information between the first and second terminal units and a synchronization function for synchronizing input or output packets with each other,
wherein the second means has a VoIP gateway function for modifying input data to have a broader bandwidth than that of an analog telephone service, and
wherein the first terminal unit uses a frequency signal having a broader bandwidth than that of the analog telephone service.

20. The communication system of claim 19, wherein the first terminal unit further comprises means for selecting either real-time or non-real-time transmission of the packets to the second terminal unit.

* * * * *